(12) United States Patent
Liao et al.

(10) Patent No.: US 8,861,111 B1
(45) Date of Patent: Oct. 14, 2014

(54) TWO DIMENSIONAL MAGNETIC RECORDING SERVO SYSTEM PHASE ALIGNMENT

(71) Applicant: LSI Corporation, San Jose, CA (US)

(72) Inventors: Yu Liao, Longmont, CO (US); Jeffrey P. Grundvig, Longmont, CO (US); Richard Rauschmayer, Longmont, CO (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 14/243,810

(22) Filed: Apr. 2, 2014

Related U.S. Application Data

(60) Provisional application No. 61/973,829, filed on Apr. 1, 2014.

(51) Int. Cl.
*G11B 5/09* (2006.01)
(52) U.S. Cl.
USPC .................. 360/39; 360/46; 360/51; 360/53; 360/55; 369/59.1

(58) Field of Classification Search
None
See application file for complete search history.

(56) References Cited

U.S. PATENT DOCUMENTS 7,639,444 B2 * 12/2009 Hutchins et al. ............... 360/53
8,300,685 B2 * 10/2012 Chen et al. ..................... 360/46
8,456,977 B2 * 6/2013 Honma ...................... 369/59.21

* cited by examiner

*Primary Examiner* — Muhammad N Edun
(74) *Attorney, Agent, or Firm* — Hamilton DeSanctis & Cha

(57) ABSTRACT

A servo system includes a first equalizer circuit operable to filter digital servo data samples derived from a first read head to yield first equalized data, a second equalizer circuit operable to filter digital servo data samples derived from a second read head to yield second equalized data, a first interpolator operable to interpolate the first equalized data to yield a number of first interpolated outputs at different phases, a second interpolator operable to interpolate the second equalized data to yield a number of second interpolated outputs at different phases, and a phase tracking and signal combining circuit operable to select and combine most closely aligned signals from the first interpolated outputs and the second interpolated outputs to yield a combined servo data signal.

20 Claims, 5 Drawing Sheets

TWO DIMENSIONAL MAGNETIC RECORDING SERVO SYSTEM PHASE ALIGNMENT

CROSS REFERENCE TO RELATED APPLICATIONS

The present application claims priority to (is a non-provisional of) U.S. Pat. App. No. 61/973,829, entitled "Two Dimensional Magnetic Recording Servo System Phase Alignment", and filed Apr. 1, 2014 by Liao et al, the entirety of which is incorporated herein by reference for all purposes.

FIELD OF THE INVENTION

Various embodiments of the present invention provide systems and methods for phase alignment in a two dimensional magnetic recording servo system.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the head assembly such that a corresponding magnetic flux pattern is induced in the storage medium. To retrieve the stored data, the head assembly is positioned again over the track as the storage medium is rotated. In this position, the previously stored magnetic flux pattern induces a current in the head assembly that can be converted to the previously recorded digital data. The location of data on the storage medium is identified by servo data.

SUMMARY

Various embodiments of the present invention provide systems, apparatuses and methods for phase alignment in a two dimensional magnetic recording servo system.

In some embodiments, a servo system includes a first equalizer circuit operable to filter digital servo data samples derived from a first read head to yield first equalized data, a second equalizer circuit operable to filter digital servo data samples derived from a second read head to yield second equalized data, a first interpolator operable to interpolate the first equalized data to yield a number of first interpolated outputs at different phases, a second interpolator operable to interpolate the second equalized data to yield a number of second interpolated outputs at different phases, and a phase tracking and signal combining circuit operable to select and combine most closely aligned signals from the first interpolated outputs and the second interpolated outputs to yield a combined servo data signal.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention.

Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

A two dimensional magnetic recording servo channel with phase alignment is disclosed herein which improves servo control based on the diversity from multiple read heads. The two dimensional magnetic recording system includes multiple read heads positioned to read a data track. The signals from each of the multiple read heads are phase aligned and combined prior to servo processing, such as, but not limited to, servo address mark (SAM) detection and Gray code detection. In some embodiments, either the phase aligned and combined signal or the individual servo signal paths can be selected for servo processing. The signals are phase aligned after equalization and interpolation, with the initial interpolation phases being set based on the Zero Error Phase Start (ZPS) values of the servo signal paths, and with interpolation phases further being tracked by a phase tracking circuit. The phase alignment disclosed herein does not require an additional interpolator before equalization, reducing phase noise and distortion as well as latency.

Figure 1:
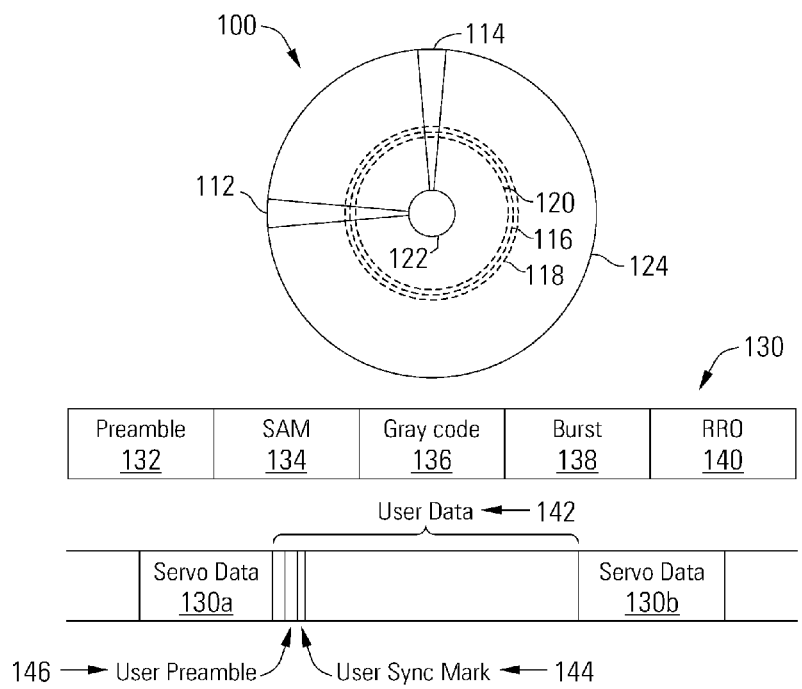
FIG. 1 is a diagram of a magnetic storage medium and sector data scheme that may be used with a two dimensional magnetic recording servo channel with phase alignment in accordance with some embodiments of the present invention.

Turning to FIG. 1, a diagram of a magnetic storage medium and sector data scheme is shown that can be used with a two dimensional magnetic recording servo channel with phase alignment in accordance with some embodiments of the present invention. The magnetic storage medium 100 is shown with an example data track 116 and its two adjacent neighboring data tracks 118, 120 on disk platter 124, indicated as dashed lines. The tracks 116, 118, 120 are segregated by servo data written within servo wedges 112, 114. It should be noted that while three tracks 116, 118, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark (SAM) 134, a Gray code 136, a burst field 138, and a repeatable run-out (RRO) field 140. In some embodiments, a servo data set has two or more fields of burst information. It should be noted that different information can be included in the servo fields. Between the servo data bit patterns 130a and 130b, a user data region 142 is provided. User data region 142 can include one or more sets of data that are stored on storage medium 100. The data sets can include user synchronization information, some of which can be used as a mark to establish a point of reference from which processing of the data within user data region 142 may begin.

In operation, storage medium 100 is rotated in relation to a sensor with multiple read heads that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. In a write operation, the sensor would sense servo data from wedge 112 then write data to the user data region between wedge 112 and wedge 114, with location information in the user data region provided by a user sync mark 144 and a user preamble 146.

The data processing system that processes some or all of the servo data (e.g., 130) retrieved from servo regions (e.g., 112) is referred to herein as a servo channel. As the servo data (e.g., 130) is processed by the servo channel, signals from multiple read heads in the two dimensional magnetic recording system are produced representing the servo data (e.g., 130). The signals are phase aligned and combined, yielding a combined servo signal with diversity. Servo address mark and Gray code detection can then be performed on the combined servo signal. In some embodiments, the servo address mark and Gray code detection can be performed on a selected servo signal, either the combined servo signal or any of the individual servo signals from the read heads in the sensor.

Figure 2:
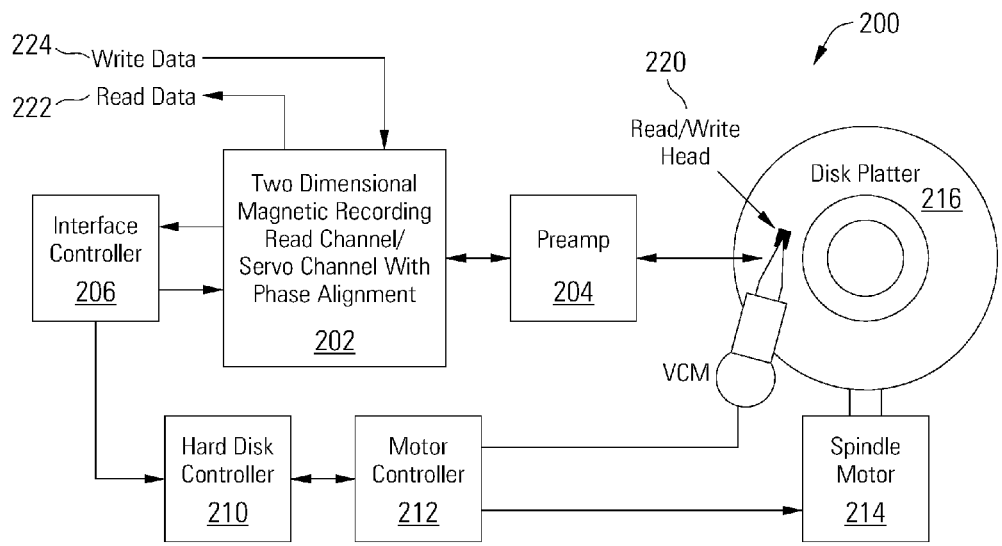
FIG. 2 depicts a storage system including a two dimensional magnetic recording read channel/servo channel with phase alignment in accordance with some embodiments of the present invention.

Turning to FIG. 2, a storage system 200 is disclosed which includes a read channel/servo channel circuit 202 with phase alignment in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, servo channel circuit 202 processes servo data to correctly position the read/write head assembly 220 over the disk platter 216, and the read channel circuit digitizes and decodes the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216. While reading servo data, read channel/servo channel circuit 202 aligns the phase of the signals from each read head in read/write head assembly 220 and combines the phase aligned signals, enabling servo data processing to be performed on the combined signal, such as, but not limited to, servo address mark detection and Gray code detection. Such phase alignment can be implemented consistent with that disclosed below in relation to FIGS. 3-6. In some cases, the phase alignment can be performed consistent with the flow diagram disclosed below in relation to FIG. 7.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 200, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Figure 3:
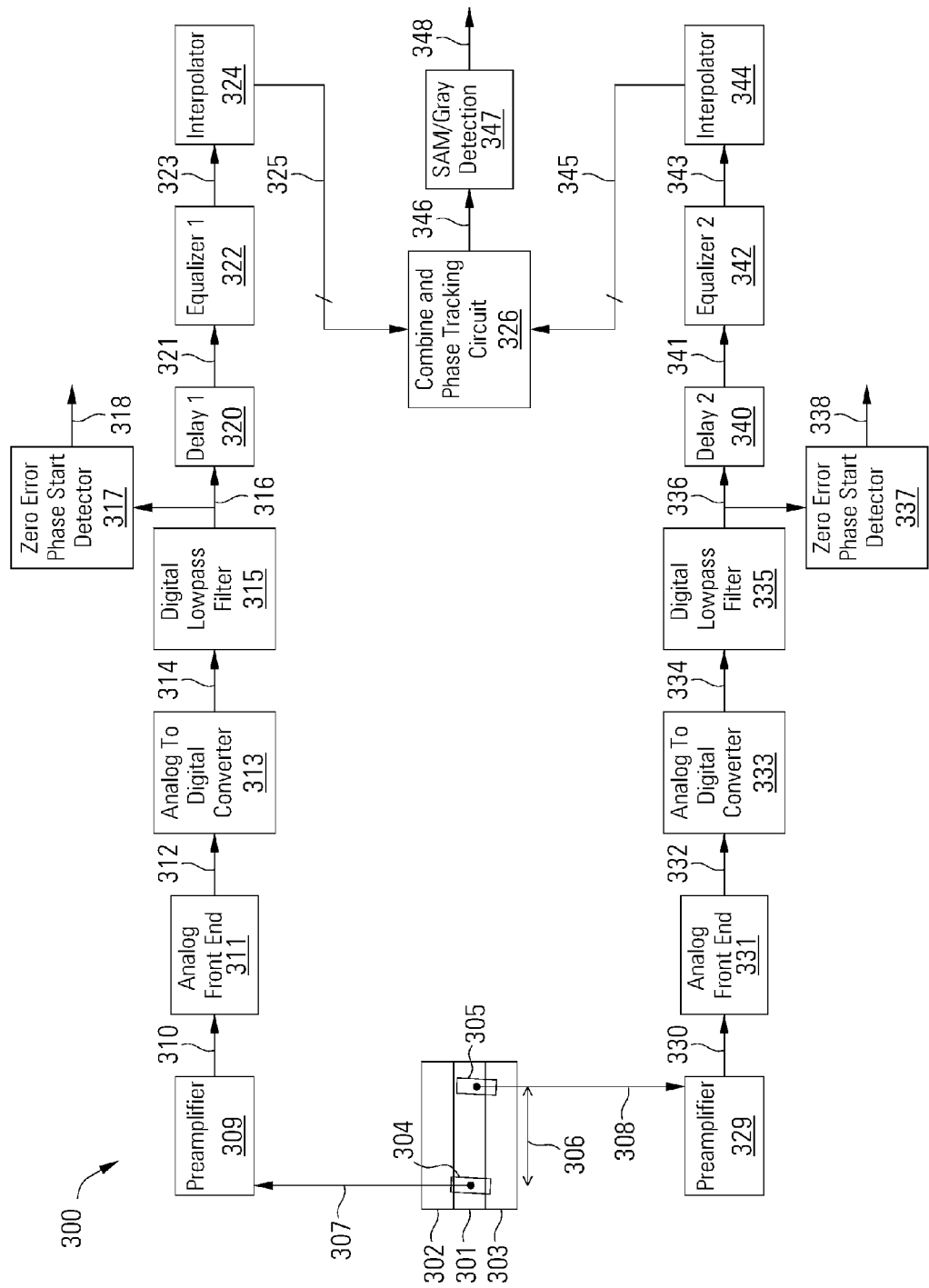
FIG. 3 is a block diagram of a two dimensional magnetic recording servo channel with phase alignment in accordance with some embodiments of the present invention.

Turning to FIG. 3, a two dimensional magnetic recording servo channel 300 with phase alignment is depicted in accordance with some embodiments of the present invention. An array reader or sensor includes multiple read heads such as, but not limited to, the two read heads 304, 305 shown in FIG. 3. The read heads 304, 305 are positioned over a target track 301 between side tracks 302, 303. In some embodiments, there is a down track separation 306 between the read heads 304, 305, causing an offset between the signals 307, 308 from the read heads 304, 305. Separate servo channel processing paths are provided for each of the signals 307, 308 from the read heads 304, 305.

Preamplifiers 309, 329 amplify the analog signals 307, 308 from read heads 304, 305, yielding amplified analog signals 310, 330. Analog signals 307, 308 may be, but are not limited to, minute analog electrical signals derived from read heads 304, 305 in a read/write head assembly that is disposed in relation to a storage medium (not shown). Based upon the disclosure provided herein, one of ordinary skill in the art will recognize a variety of sources from which analog signals 307, 308 may be derived. Analog front end circuits 311, 331 receive and process the amplified analog signals 310, 330, providing processed analog signals 312, 332 to analog to digital converter circuits 313, 333. Analog front end circuits 311, 331 may include, but are not limited to, an analog filter and an amplifier circuit as are known in the art. Based upon the disclosure provided herein, one of ordinary skill in the art will recognize a variety of circuitry that may be included as part of analog front end circuits 311, 331.

Analog to digital converter circuits 313, 333 convert processed analog signals 312, 332 into corresponding series of digital samples 314, 334. Analog to digital converter circuits 313, 333 may be any circuits known in the art that are capable of producing digital samples corresponding to analog input signals. Based upon the disclosure provided herein, one of ordinary skill in the art will recognize a variety of analog to digital converter circuits that may be used in relation to different embodiments of the present invention. Digital samples 314, 334 are provided to digital lowpass filters 315, 335, which filter the digital samples 314, 334 in any suitable manner to reduce noise and improve downstream detection. Based upon the disclosure provided herein, one of ordinary skill in the art will recognize a variety of digital lowpass filter circuits that may be used in relation to different embodiments of the present invention.

The filtered digital samples 316, 336 are provided to Zero Error Phase Start (ZPS) detector circuits 317, 337, which calculate estimated starting phases 318, 338 to be selected from interpolators 324, 344. The Zero Error Phase Start detector circuits 317, 337 can calculate the estimated starting phases 318, 338 in any suitable manner, for example based on a sinusoidal pattern (e.g., 00110011) in the preamble field 132 of the servo data. Based upon the disclosure provided herein, one of ordinary skill in the art will recognize a variety of Zero Error Phase Start detector circuits that may be used in relation to different embodiments of the present invention.

The filtered digital samples 316, 336 are also provided to delay circuits 320, 340 which delay the filtered digital samples 316, 336 to correct for integer delays between the signals 307, 308 from the read heads 304, 305, due, for example, to the down track separation 306. In other words, where the period of the signals 307, 308 is T, the delay circuits 320, 340 delay the earlier of the filtered digital samples 316, 336 to correct for phase differences between signals 307, 308 that are integer multiples of T, while the estimated starting phase 318 compensates for sub-T fractional phase differences. The delay circuit 320 delays the filtered digital samples 316 only when they are advanced in relation to the corresponding filtered digital samples 336 from the other read head 305. The delay circuit 340 delays the filtered digital samples 336 only when they are advanced in relation to the corresponding filtered digital samples 316 from the other read head 304. The delay circuits 320, 340 yield digital samples 321, 341 which have at most a sub-T fractional phase difference. Based upon the disclosure provided herein, one of ordinary skill in the art will recognize a variety of delay circuits that may be used in relation to different embodiments of the present invention, such as, but not limited to, flip-flops, latches and logic chains.

The digital samples 321, 341 are provided to equalizer circuits 322, 342. Equalizer circuits 322, 342 apply an equalization algorithm to digital samples 321, 341 to yield equalized outputs 323, 343. In some embodiments of the present invention, equalizer circuits 322, 342 are digital finite impulse response filter circuits as are known in the art. Based upon the disclosure provided herein, one of ordinary skill in the art will recognize a variety of equalizer circuits that may be used in relation to different embodiments of the present invention.

Interpolators 324, 344 receive the equalized outputs 323, 343 and each yield a number of corresponding outputs 325, 345 with different phase offsets. The interpolators 324, 344 can yield any number of different phase signals with any desired resolution based on the implementation complexity and performance tradeoff, such as, but not limited to, 8 outputs at T/8 phase shift intervals, or 32 outputs at T/32 phase shift intervals, etc. In some embodiments, interpolators 324, 344 comprise banks of digital phase interpolators. Interpolators 324, 344 can be any circuits known in the art that are capable of interpolating between digital samples to effectively change the sampling phase in the interpolated outputs 325, 345. Based upon the disclosure provided herein, one of ordinary skill in the art will recognize a variety of interpolation circuits that may be used in relation to different embodiments of the present invention.

A combination and phase tracking circuit 326 receives the interpolated signals 325, 345, selecting phases of the interpolated signals 325, 345 that are aligned or most nearly aligned, and combining the selected phases of the interpolated signals 325, 345 to yield a phase aligned and combined signal 346. In some embodiments, the combination and phase tracking circuit 326 perform open loop phase tracking of interpolated signals 325, 345, removing any phase variations that may occur before selecting the phases to be combined. The phase tracking circuit can be any circuit known in the art that is capable of detecting phase changes using open loop control and stabilizing the phase of the output samples. Based upon the disclosure provided herein, one of ordinary skill in the art will recognize a variety of phase tracking circuits that can be used in relation to different embodiments of the present invention.

A servo address mark/Gray code detector circuit 347 searches for servo address marks and performs Gray code decoding on the phase aligned and combined signal 346. By performing servo processing on the phase aligned and combined signal 346 which includes the diversity of multiple sensor signals, servo control is improved. The servo address mark/Gray code detector circuit 347 is operable in some embodiments to detect values of servo address mark bits and Gray code bits in phase aligned and combined signal 346. In some embodiments, servo address mark/Gray code detector circuit 347 includes a peak detector as is known in the art. Based upon the disclosure provided herein, one of ordinary skill in the art will recognize a variety of data detector circuits that can be used in relation to different embodiments of the present invention. The servo address mark bits and Gray code bits in hard decision output 348 can be used for any suitable purpose, such as, but not limited to, determining whether the read/write head assembly (e.g., 220) is positioned correctly over the disk platter (e.g., 216).

Figure 4:
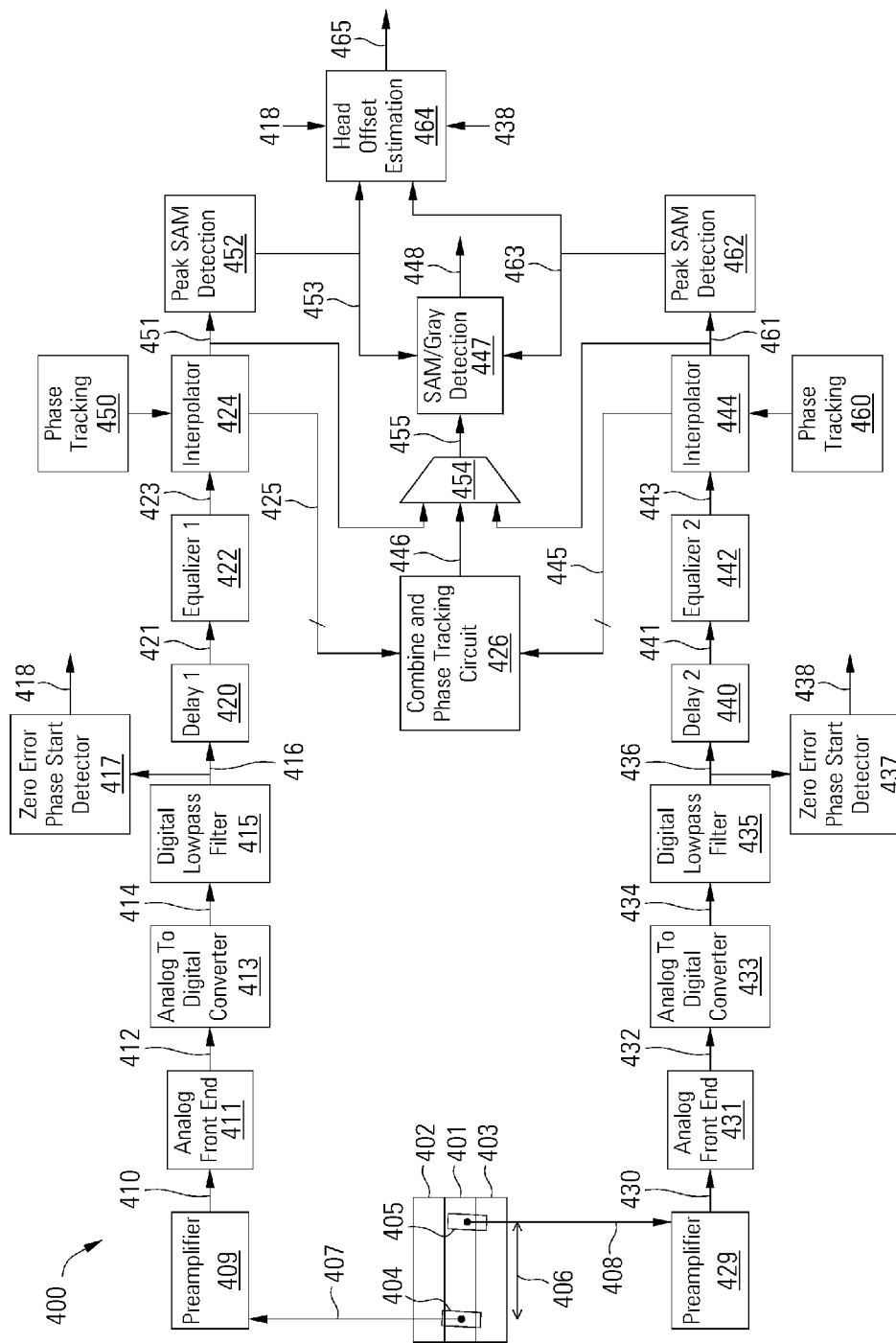
FIG. 4 is a block diagram of a two dimensional magnetic recording servo channel with phase alignment and with individual and combined path selection in accordance with some embodiments of the present invention.

Turning to FIG. 4, a block diagram of a two dimensional magnetic recording servo channel 400 with phase alignment and with individual and combined path selection is shown in accordance with some embodiments of the present invention. The read heads 304, 405 are positioned over a target track 401 between side tracks 402, 403. In some embodiments, there is a down track separation 406 between the read heads 404, 405, causing an offset between the signals 407, 408 from the read heads 404, 405. Separate servo channel processing paths are provided for each of the signals 407, 408 from the read heads 404, 405.

Preamplifiers 409, 429 amplify the analog signals 407, 408 from read heads 404, 405, yielding amplified analog signals 410, 430. Analog signals 407, 408 may be, but are not limited to, minute analog electrical signals derived from read heads 404, 405 in a read/write head assembly that is disposed in relation to a storage medium (not shown). Based upon the disclosure provided herein, one of ordinary skill in the art will recognize a variety of sources from which analog signals 407, 408 may be derived. Analog front end circuits 411, 431 receive and process the amplified analog signals 410, 430, providing processed analog signals 412, 432 to analog to digital converter circuits 413, 433. Analog front end circuits 411, 431 may include, but are not limited to, an analog filter and an amplifier circuit as are known in the art. Based upon the disclosure provided herein, one of ordinary skill in the art will recognize a variety of circuitry that may be included as part of analog front end circuits 411, 431.

Analog to digital converter circuits 413, 433 convert processed analog signals 412, 432 into corresponding series of digital samples 414, 434. Analog to digital converter circuits 413, 433 may be any circuits known in the art that are capable of producing digital samples corresponding to analog input signals. Based upon the disclosure provided herein, one of ordinary skill in the art will recognize a variety of analog to digital converter circuits that may be used in relation to different embodiments of the present invention. Digital samples 414, 434 are provided to digital lowpass filters 415, 435, which filter the digital samples 414, 434 in any suitable manner to reduce noise and improve downstream detection. Based upon the disclosure provided herein, one of ordinary skill in the art will recognize a variety of digital lowpass filter circuits that may be used in relation to different embodiments of the present invention.

The filtered digital samples 416, 436 are provided to Zero Error Phase Start (ZPS) detector circuits 417, 437, which calculate estimated starting phases 418, 438 to be selected from interpolators 424, 444. The Zero Error Phase Start detector circuits 417, 437 can calculate the estimated starting phases 418, 438 in any suitable manner, for example based on a sinusoidal pattern (e.g., 00110011) in the preamble field 132 of the servo data. Based upon the disclosure provided herein, one of ordinary skill in the art will recognize a variety of Zero Error Phase Start detector circuits that may be used in relation to different embodiments of the present invention.

The filtered digital samples 416, 436 are also provided to delay circuits 420, 440 which delay the filtered digital samples 416, 436 to correct for integer delays between the signals 407, 408 from the read heads 404, 405, due, for example, to the down track separation 406. In other words, where the period of the signals 407, 408 is T, the delay circuits 420, 440 delay the earlier of the filtered digital samples 416, 436 to correct for phase differences between signals 407, 408 that are integer multiples of T, while the estimated starting phase 418 compensates for sub-T fractional phase differences. The delay circuit 420 delays the filtered digital samples 416 only when they are advanced in relation to the corresponding filtered digital samples 436 from the other read head 405. The delay circuit 440 delays the filtered digital samples 436 only when they are advanced in relation to the corresponding filtered digital samples 416 from the other read head 404. The delay circuits 420, 440 yield digital samples 421, 441 which have at most a sub-T fractional phase difference. Based upon the disclosure provided herein, one of ordinary skill in the art will recognize a variety of delay circuits that may be used in relation to different embodiments of the present invention, such as, but not limited to, flip-flops, latches and logic chains.

The digital samples 421, 441 are provided to equalizer circuits 422, 442. Equalizer circuits 422, 442 apply an equalization algorithm to digital samples 421, 441 to yield equalized outputs 423, 443. In some embodiments of the present invention, equalizer circuits 422, 442 are digital finite impulse response filter circuits as are known in the art. Based upon the disclosure provided herein, one of ordinary skill in the art will recognize a variety of equalizer circuits that may be used in relation to different embodiments of the present invention.

Interpolators 424, 444 receive the equalized outputs 423, 443 and each yield a number of corresponding outputs 425, 445 with different phase offsets. The interpolators 424, 444 can yield any number of different phase signals with any desired resolution based on the implementation complexity and performance tradeoff, such as, but not limited to, 8 outputs at T/8 phase shift intervals, or 42 outputs at T/32 phase shift intervals, etc. In some embodiments, interpolators 424, 444 comprise banks of digital phase interpolators. Interpolators 424, 444 can be any circuits known in the art that are capable of interpolating between digital samples to effectively change the sampling phase in the interpolated outputs 425, 445. Based upon the disclosure provided herein, one of ordinary skill in the art will recognize a variety of interpolation circuits that may be used in relation to different embodiments of the present invention.

Phase tracking circuits 450, 460 perform open loop phase tracking of equalized outputs 423, 443, stabilizing the phase of interpolated samples 451, 461, removing or reducing phase variations that may occur by selecting among the different phases in interpolators 424, 444 as the phase of equalized outputs 423, 443 vary. Phase tracking circuits 450, 460 can be any circuits known in the art that is capable of detecting phase changes using open loop control and stabilizing the phase of the output samples. Based upon the disclosure provided herein, one of ordinary skill in the art will recognize a variety of phase tracking circuits that can be used in relation to different embodiments of the present invention.

Peak servo address mark detection circuits 452, 462 receive the stabilized interpolated samples 451, 461 and apply a low latency but relatively low accuracy peak detection algorithm to bi-phase encoded servo data to detect servo address marks. Peak servo address mark detection circuits 452, 462 yield servo address mark detected signals 453, 463, indicating when servo address marks have been detected in the servo data by the peak detection algorithms. Based upon the disclosure provided herein, one of ordinary skill in the art will recognize a variety of peak detection circuits that can be used to detect servo address marks in relation to different embodiments of the present invention.

A combination and phase tracking circuit 426 receives the interpolated signals 425, 445, selecting phases of the interpolated signals 425, 445 that are aligned or most nearly aligned, and combining the selected phases of the interpolated signals 425, 445 to yield a phase aligned and combined signal 446. In some embodiments, the combination and phase tracking circuit 426 perform open loop phase tracking of interpolated signals 425, 445, removing any phase variations that may occur before selecting the phases to be combined. The phase tracking circuit can be any circuit known in the art that is capable of detecting phase changes using open loop control and stabilizing the phase of the output samples. Based upon the disclosure provided herein, one of ordinary skill in the art will recognize a variety of phase tracking circuits that can be used in relation to different embodiments of the present invention.

A multiplexer 454 can be used to select as output 455 either the phase aligned and combined signal 446 or either of the stabilized interpolated signals 451, 461 in which to search for servo address marks and perform Gray code decoding.

A servo address mark/Gray code detector circuit 447 searches for servo address marks and performs Gray code decoding on the output 455 of the multiplexer 454. The servo address mark/Gray code detector circuit 447 is operable in some embodiments to detect values of servo address mark bits and Gray code bits in phase aligned and combined signal 446. In some embodiments, servo address mark/Gray code detector circuit 447 is assisted by servo address mark detected signals 453, 463. Based upon the disclosure provided herein, one of ordinary skill in the art will recognize a variety of data detector circuits that can be used in relation to different embodiments of the present invention. The servo address mark bits and Gray code bits in hard decision output 448 can be used for any suitable purpose, such as, but not limited to, determining whether the read/write head assembly (e.g., 220) is positioned correctly over the disk platter (e.g., 216).

A head offset estimation circuit 464 is operable to compute an estimated head offset signal 465 indicating the offset of the read heads from the center of the target data track, based on the servo address mark detected signals 453, 463 and on the estimated starting phases 418, 438 from the Zero Error Phase Start detector circuits 417, 437. Based upon the disclosure provided herein, one of ordinary skill in the art will recognize a variety of offset detection circuits that can be used in relation to different embodiments of the present invention.

Figure 5:
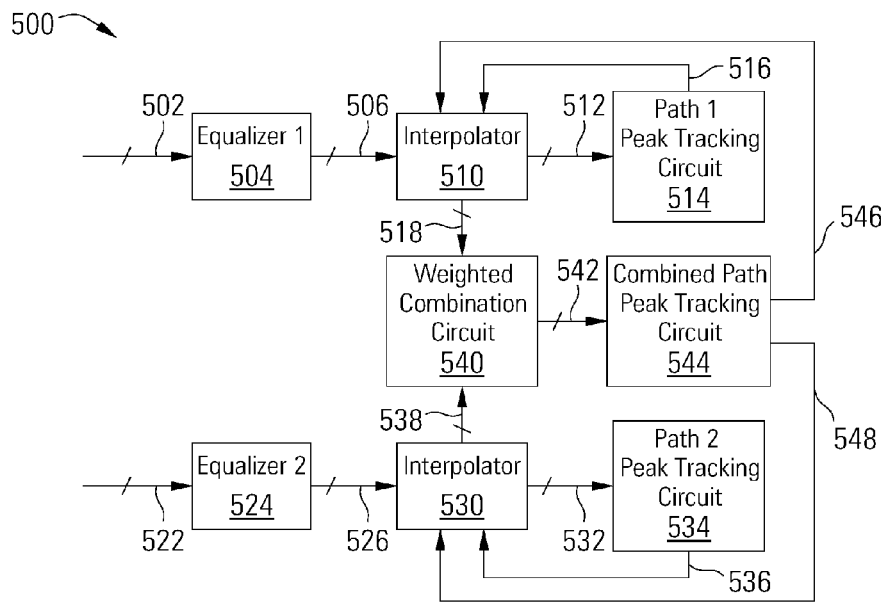
FIG. 5 is a block diagram illustrating phase tracking in a two dimensional magnetic recording servo channel in accordance with some embodiments of the present invention.

Turning to FIG. 5, a block diagram 500 illustrates an example of phase tracking in a two dimensional magnetic recording servo channel in accordance with some embodiments of the present invention. Three independent phase tracking circuits 514, 534, 544 are included, one 514 for the first independent servo channel path, one 534 for the second independent servo channel path, and one 544 for the combined path. A signal 502 in a first path from a first read head, in which integer delays between a second path have been cancelled, is provided to an equalizer 504, yielding equalized signal 506. An interpolator 510 receives equalized signal 506 and generates 32 output phases 518 to be provided to a weighted combination circuit 540, and provides 3 output phases 512 to a first path peak tracking circuit 514. The first path peak tracking circuit 514 generates a signal 516 aiding the interpolator 510 to remove phase variations from the first path. A signal 522 in a second path from a second read head, in which integer delays between the first path have been cancelled, is provided to an equalizer 524, yielding equalized signal 526. An interpolator 530 receives equalized signal 526 and generates 32 output phases 538 to be provided to the weighted combination circuit 540, and provides 3 output phases 532 to a second path peak tracking circuit 534. The second path peak tracking circuit 534 generates a signal 536 aiding the interpolator 530 to remove phase variations from the second path. The weighted combination circuit 540 combines the most closely aligned signals between the 32 output phases 518 for the first path and the 32 output phases 538 for the second path, yielding a three phase output 542 (for example, 0T, ⅛ T, and ⅞ T phases of the combined signal). A combined path peak tracking circuit 544 generates signals 546, 548, aiding interpolators 510, 530 to remove phase variations from the first and second paths, respectively, such that the two paths are approximately in phase when they are combined.

Figure 6:
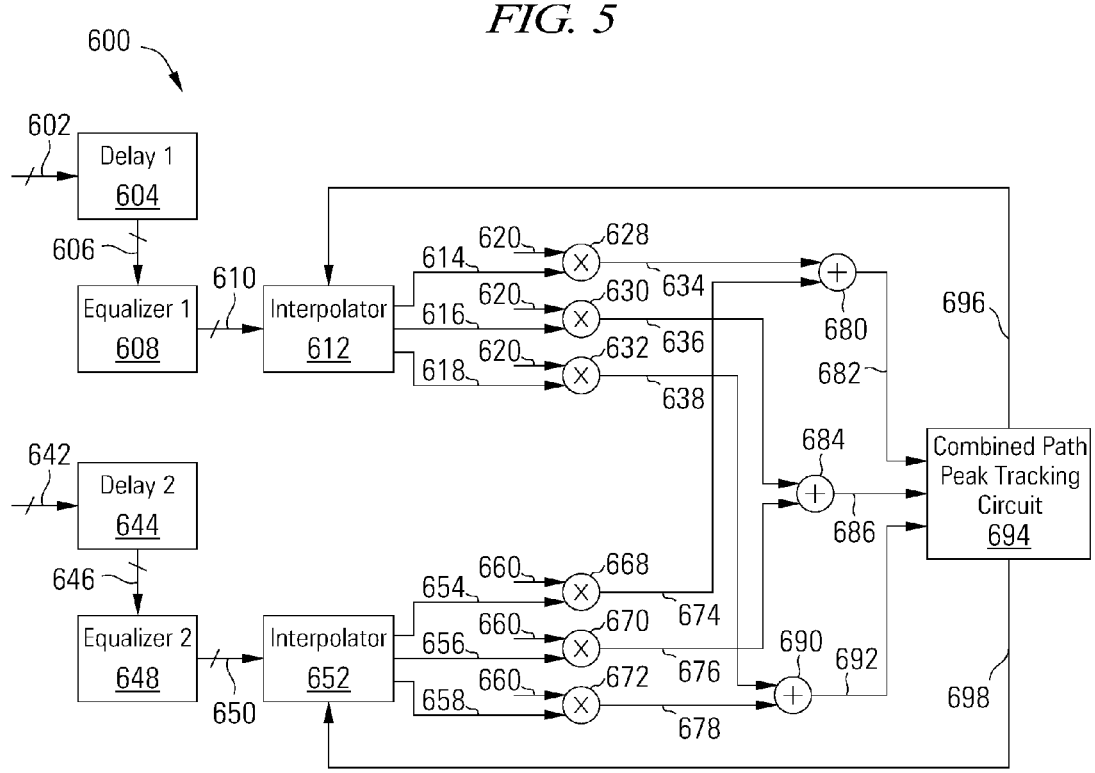
FIG. 6 is a block diagram illustrating an example of phase tracking in a two dimensional magnetic recording servo channel in accordance with some embodiments of the present invention.

Turning to FIG. 6, a block diagram 600 illustrates an example of phase tracking in a two dimensional magnetic recording servo channel in accordance with some embodiments of the present invention. A signal 602 derived from a first read head in a first servo path is provided to a delay circuit 604, which removes integer delays between a second path. The output 606 from delay circuit 604 is provided to an equalizer 608, yielding equalized signal 610. An 8-phase interpolator 612 receives equalized signal 610 and generates 3 output phases, a 0T phase 616, a ⅛ T phase 614, and a ⅞ T phase 618. (Again, it is important to note that the number of phases generated by the interpolators is not limited to the examples given herein, nor are the phase offsets of interpolator outputs limited to the examples given herein.) Similarly, a signal 642 derived from a second read head in a second servo path is provided to a delay circuit 644, which removes integer delays between the second path and the first path. The output 646 from delay circuit 644 is provided to an equalizer 648, yielding equalized signal 650. An 8-phase interpolator 652 receives equalized signal 650 and generates 3 output phases, a 0T phase 656, a ⅛ T phase 654, and a ⅞ T phase 658.

The output phases 614, 616, 618 for the first path are weighted by a weighting factor 620 in multipliers 628, 630, 632, yielding weighted output phases 634, 636, 638. The output phases 654, 656, 658 for the second path are weighted by a weighting factor 660 in multipliers 668, 670, 672, yielding weighted output phases 674, 676, 678. Corresponding phases are added in adders 684, 680, 690, yielding combined signals 682, 686, 692 for phases 0T, ⅛ T, and ⅞ T, respectively. A combined path peak tracking circuit 694 receives the combined signals 682, 686, 692 and generates signals 696, 698, aiding interpolators 612, 652 to remove phase variations from the first and second paths, respectively, such that the two paths are approximately in phase when they are combined.

The phase tracking for the weighted combination tracks the phases of the two paths such that the two paths are approximately in phase when they are combined. One example is shown in FIG. 6, which shows only the weighted combination of the peak quarter rate phase in the phase tracking, using eight phases at T/8 phase intervals.

In this example, the two read heads have the same interpolation phase 0T. The streams 634, 636, 638 with interpolation phases 0T, ⅛ T, and ⅞ T from the first head are combined with the streams 674, 676, 678 with interpolation phases 0T, ⅛ T, and ⅞ T from the second head. (The relative strength of each path in the combination can be adjusted by weighting factors

620, 660.) The three combined streams 682, 686, 692 are provided to the combined path peak tracking circuit 694 to determine whether the interpolation phases of the two heads should be moved by −T/8, T/8 or 0T. The loop latency for first path peak tracking and second path peak tracking is 4T and the loop latency for the combined path peak tracking can be as much as 12T.

More generally, the interpolation phases of the two paths are initially set based on the ZPS estimation of the two paths. Assume ZPS values are Q1, Phi1, Q2 and Phi2 for the first and second paths, respectively, where 0≤Q1, Q2<4 represent the integer T rotation, and Phi1 and Phi2 the interpolator index for the sub-T rotation with 0≤Phi1, Phi2<8.

It is further assumed that the phase offset between the two heads is ΔT≥0 and M=floor(ΔT/T) based on the estimation of the down track offset between the two heads. The integer T rotation before the combination should be Q1c=Q1 and Q2c=mod(Q2+M, 4) for the first path and second path, respectively, assuming for example that the second read head is leading and delay circuits (e.g., 604, 644) compensate for the M*T integer delay between the two read heads.

After ZPS, the streams with interpolation phases $Phi1_m$, Phi1, and $Phi1_p$ from the first read head are combined with the streams with interpolation phases $Phi2_m$, Phi2, and $Phi2_p$ from the second read head, where $$Phi1_m = mod(Phi1-1+8,8), Phi1_p = mod(Phi1+1,8)$$

$$Phi2_m = mod(Phi2-1+8,8), Phi2_p = mod(Phi2+1,8) \quad \text{(Eq 1)}$$

The combined signals 686, 682, 692 for the peak y and the ±T/8 shifted peaks $y_m$ and $y_p$, respectively, are provided to the combined path peak tracking circuit 694, calculated as:

$$y_m = y1(Phi1_m, Q1c_m) + y2(Phi2_m, Q2c_m)$$

$$y = y1(Phi1, Q1c) + y2(Phi2, Q2c)$$

$$y_p = y1(Phi1_p, Q1c_p) + y2(Phi2_p, Q2c_p) \quad \text{(Eq 2)}$$

where y1(Phi1, Q1c) is the peak for the signal from the first read head, y2(Phi2, Q2c) is the peak for the signal from the second read head, $y1(Phi1_m, Q1c_m)$ and $y2(Phi2_m, Q2c_m)$ are the −T/8 shifted peaks, $y1(Phi1_p, Q1c_p)$ and $y2(Phi2_p, Q2c_p)$ are the +T/8 shifted peaks, where $Q1c_m$ and $Q1c_p$ are the peak quadrant indexes for the ±T/8 shifted peaks for the first path, computed as follows:

$$Q1c_m = \begin{cases} Q1c, & \text{if } Phi1_m < Phi1 \\ mod(Q1c-1+4,4), & \text{if } Phi1_m > Phi1 \end{cases} \quad \text{(Eq 3)}$$

$$Q1c_p = \begin{cases} Q1c, & \text{if } Phi1_p > Phi1 \\ mod(Q1c+1+4,4), & \text{if } Phi1_p < Phi1 \end{cases}$$

The peak quadrant indexes $Q2c_m$ and $Q2c_p$ are the peak quadrant indexes for the ±T/8 shifted peaks for the second path, computed as follows:

$$Q2c_m = \begin{cases} Q2c, & \text{if } Phi2_m < Phi2 \\ mod(Q2c-1+4,4), & \text{if } Phi2_m > Phi2 \end{cases} \quad \text{(Eq 4)}$$

$$Q2c_p = \begin{cases} Q2c, & \text{if } Phi2_p > Phi2 \\ mod(Q2c+1+4,4), & \text{if } Phi2 < Phi2 \end{cases}$$

The combined path peak tracking circuit 694 selects the interpolation phases and the peak quadrant index for the next cycle as follows. Let $y_{max}=\max(abs(y_m), abs(y), abs(y_p))$ and $shift_0$, $shift_m$, $shift_p$ be the flags of whether to stay, move backward or forward of the interpolation phases. The interpolation phases and peak quadrant index do not change for the next cycle if the following condition is met:

$$y_{max} = abs(y) \text{ or } (shift_m == 0 \ \& \ shift_p == 0) \quad \text{(Eq 5)}$$

In Equations 5, the flags $shift_m$ and $shift_p$ are given as follows:

$$shift_m = \begin{cases} 1, & \text{if } (y_{max} == abs(y_m)) \ \& \ y_{max} - abs(y) > th_p \\ 0, & \text{otherwise} \end{cases} \quad \text{(Eq 6)}$$

$$shift_p = \begin{cases} 1, & \text{if } (y_{max} == abs(y_p)) \ \& \ y_{max} - abs(y) > th_p \\ 0, & \text{otherwise} \end{cases}$$

where the threshold $th_p$ is, in some embodiments, a programmable with 16 integer values [0, 1, ..., 15] and stored in a register with a default value 7.

If the flag $shift_m=1$, the interpolation phases and peak quadrant index are updated as follows:

$$Phi1 = Phi1_m, Q1c = Q1c_m$$

$$Phi2 = Phi2_m, Q2c = Q2c_m \quad \text{(Eq 7)}$$

If the flag $shift_p=1$, the interpolation phases and peak quadrant index are updated as follows:

$$Phi1 = Phi1_p, Q1c = Q1c_p$$

$$Phi2 = Phi2_p, Q2c = Q2c_p \quad \text{(Eq 8)}$$

The Equations 5 through 8 describe one example mode of peak tracking. In some embodiments, another mode of peak tracking is performed by modifying the conditions in Equation 6 as follows. To claim the flag $shift_m=1$, besides the condition of $(y_{max}==abs(y_m)) \ \& \ y_{max}-abs(y)>th_p$, the additional condition must be met:

$$(y_{max\_old} == abs(y_{m\_old})) \ \& \ y_{max\_old} - abs(y_{old}) > th_p \quad \text{(Eq 9)}$$

where $y_{max\_old}=\max(abs(y_{m\_old}), abs(y_{old}), abs(y_{p\_old}))$, where $y_{old}$, $y_{m\_old}$ and $y_{p\_old}$ are the peak and shifted peaks of the previous cycle.

Similarly, To claim the flag $shift_p=1$, besides the condition of $(y_{max}==abs(y_p)) \ \& \ y_{max}-abs(y)>th_p$, the additional condition must be met:

$$(y_{max\_old} == abs(y_{p\_old})) \ \& \ y_{max\_old} - abs(y_{old}) > th_p \quad \text{(Eq 10)}$$

In some embodiments, the two peak tracking modes disclosed above can be selected by setting a register value in a servo channel controller.

Figure 7:
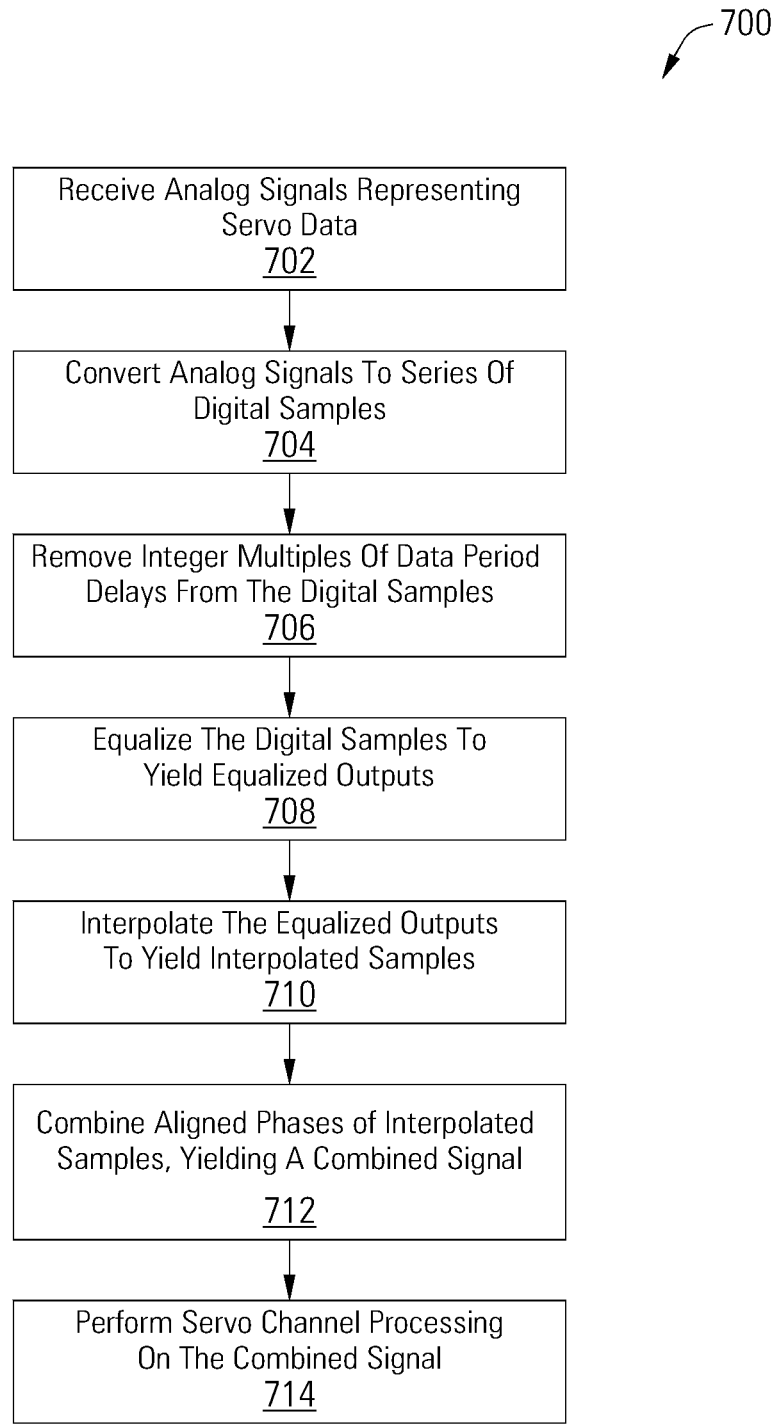
FIG. 7 is a flow diagram showing a method for phase alignment in a two dimensional magnetic recording servo channel in accordance with some embodiments of the present invention.

Turning to FIG. 7, a flow diagram 700 shows a method for phase alignment in a two dimensional magnetic recording servo channel in accordance with some embodiments of the present invention. Following flow diagram 700, analog signals representing servo data are received. (Block 702) Any number of analog signals can be received, based on the number of read heads in the array reader. The analog signals are converted to series of digital samples. (Block 704) Integer multiples of data period delays are removed from the series of digital samples. (Block 706) The resulting servo channels have only sub-T phase differences. The digital samples are equalized to yield equalized outputs. (Block 708) The equalized outputs are interpolated to yield interpolated samples. (Block 710) Phases of aligned interpolated samples from each read head are combined, yielding a combined signal. (Block 712) Servo channel processing is then performed on the combined signal, such as, but not limited to, servo address mark detection and Gray code decoding. (Block 714)

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel phase alignment and combination of servo signals in a two dimensional magnetic recording servo system. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A servo system comprising:
    a first equalizer circuit operable to filter digital servo data samples derived from a first read head to yield first equalized data;
    a second equalizer circuit operable to filter digital servo data samples derived from a second read head to yield second equalized data;
    a first interpolator operable to interpolate the first equalized data to yield a plurality of first interpolated outputs at different phases;
    a second interpolator operable to interpolate the second equalized data to yield a plurality of second interpolated outputs at different phases; and
    a phase tracking and signal combining circuit operable to select and combine most closely aligned signals from the plurality of first interpolated outputs and the plurality of second interpolated outputs to yield a combined servo data signal.

2. The servo system of claim 1, wherein the first read head and the second read head are positioned to read a same data track.

3. The servo system of claim 1, further comprising a servo address mark detector circuit operable to detect a servo address mark in the combined servo data signal.

4. The servo system of claim 3, further comprising a multiplexer operable to provide one of the combined servo data signal, an output of the first interpolator or an output of the second interpolator to the servo address mark detector circuit.

5. The servo system of claim 4, further comprising:
    a first peak servo address mark detector operable to detect the servo address mark in an output of the first interpolator; and
    a second peak servo address mark detector operable to detect the servo address mark in an output of the second interpolator.

6. The servo system of claim 5, further comprising a head offset estimation circuit operable to estimate an offset of the first read head and the second read head with respect to a data track based at least in part on outputs of the first peak servo address mark detector and of the second peak servo address mark detector.

7. The servo system of claim 1, further comprising:
    a first delay circuit operable to delay the digital servo data samples derived from the first read head by an integer multiple of a sample period when the digital servo data samples derived from the first read head are advanced by at least a full sample period over the digital servo data samples derived from the second read head; and
    a second delay circuit operable to delay the digital servo data samples derived from the second read head by an integer multiple of a sample period when the digital servo data samples derived from the second read head are advanced by at least a full sample period over the digital servo data samples derived from the first read head.

8. The servo system of claim 1, further comprising:
    a first digital lowpass filter operable to filter the digital servo data samples derived from the first read head prior to equalization; and
    a second digital lowpass filter operable to filter the digital servo data samples derived from the second read head prior to equalization.

9. The servo system of claim 8, further comprising:
    a first zero error phase start detector circuit operable to detect an initial phase offset selected in the first interpolator based on an output of the first digital lowpass filter; and
    a second zero error phase start detector circuit operable to detect an initial phase offset selected in the second interpolator based on an output of the second digital lowpass filter.

10. The servo system of claim 1, wherein the first read head and the second read head comprise an array reader in a two dimensional magnetic recording system.

11. The servo system of claim 1, wherein the phase tracking and signal combining circuit is operable to apply weighting factors to the most closely aligned signals from the plurality of first interpolated outputs and the plurality of second interpolated outputs before combining them to yield the combined servo data signal.

12. The servo system of claim 1, further comprising a combined path peak tracking circuit operable to compare three input phases of the combined servo data signal to determine whether the first interpolator and the second interpolator should advance, delay or maintain an output phase.

13. The servo system of claim 1, wherein the first and second equalizers, first and second interpolators and the phase tracking and signal combining circuit are embodied in an integrated circuit.

14. The servo system of claim 1, wherein the servo system is embodied in a storage system.

15. A method for phase alignment in a two dimensional magnetic recording servo channel, comprising:
    equalizing a first servo signal derived from a first read head to yield a first equalized signal;
    equalizing a second servo signal derived from a second read head to yield a second equalized signal;
    interpolating the first equalized signal to yield first interpolated signals at a plurality of different phase offsets;
    interpolating the second equalized signal to yield second interpolated signals at a plurality of different phase offsets; and selecting and combining most nearly phase aligned signals of the first interpolated signals and the second interpolated signals to yield a combined servo signal.

16. The method of claim 15, further comprising searching for a servo address mark in the combined servo signal.

17. The method of claim 15, further comprising selecting either the first interpolated signals or the second interpolated signals to be searched for the servo address mark instead of the combined servo signal.

18. The method of claim 15, further comprising detecting a first zero error phase start signal based on the first servo signal, detecting a second zero error phase start signal based on the second servo signal, and selecting initial phase offsets for use in the interpolating of the first equalized signal and in the interpolating of the second equalized signal based at least in part on the first zero error phase start signal and on the second zero error phase start signal.

19. The method of claim 15, further removing integer multiples of sample period delays in the first servo signal or the second servo signal.

20. A storage device, comprising:
a storage medium operable to store user data and servo data;
a head assembly disposed in relation to the storage medium and operable to read and write data on the storage medium; and
a servo system operable to combine signals from a plurality of read heads, the servo system comprising:
a first equalizer circuit operable to filter digital servo data samples derived from a first of the plurality of read heads to yield first equalized data;
a second equalizer circuit operable to filter digital servo data samples derived from a second of the plurality of read heads to yield second equalized data;
a first interpolator operable to interpolate the first equalized data to yield a plurality of first interpolated outputs at different phases;
a second interpolator operable to interpolate the second equalized data to yield a plurality of second interpolated outputs at different phases; and
a phase tracking and signal combining circuit operable to select and combine most closely aligned signals from the plurality of first interpolated outputs and the plurality of second interpolated outputs to yield a combined servo data signal.

* * * * *